United States Patent [19]

Zen

[11] Patent Number: 4,657,009

[45] Date of Patent: Apr. 14, 1987

[54] CLOSED PASSAGE TYPE EQUI-PRESSURE COMBUSTION ROTARY ENGINE

[76] Inventor: Sheng T. Zen, 5-3, Jia-An W. Rd., Jia-An Village, Long Tarn Shiang, Taur Yuan Shiann, Taiwan

[21] Appl. No.: 609,852

[22] Filed: May 14, 1984

[51] Int. Cl.$^4$ .............................................. F02G 3/00
[52] U.S. Cl. .................................... 123/204; 123/213; 123/235; 123/237; 60/39.55; 418/61 R; 418/140; 418/187
[58] Field of Search ............... 123/204, 235, 297, 213; 60/39.63, 753, 39.05, 39.55; 418/187

[56] References Cited

U.S. PATENT DOCUMENTS

| | | | |
|---|---|---|---|
| 2,186,706 | 1/1940 | Martinka | 60/39.05 |
| 2,564,497 | 8/1951 | Navias | 60/753 X |
| 3,298,331 | 1/1967 | Butler | 418/187 X |
| 3,520,132 | 7/1970 | Warren | 60/39.63 X |
| 3,693,600 | 9/1972 | Nutku | 418/188 X |
| 4,015,424 | 4/1977 | Shinehara | 60/39.63 X |
| 4,215,533 | 8/1980 | Silvestri | 60/39.63 |
| 4,517,802 | 5/1985 | Kobayashi et al. | 60/606 |

FOREIGN PATENT DOCUMENTS

| | | | |
|---|---|---|---|
| 914686 | 8/1954 | Fed. Rep. of Germany | 123/204 |
| 1815711 | 6/1970 | Fed. Rep. of Germany | 123/204 |
| 2952640 | 7/1981 | Fed. Rep. of Germany | 123/204 |

Primary Examiner—Michael Koczo
Attorney, Agent, or Firm—Wenderoth, Lind & Ponack

[57] ABSTRACT

A rotary engine including a compressor, an external pressure vessel, an internal pressure vessel defining a combustion chamber, and a fuel nozzle opening into the combustion chamber. Both compressed air and fuel are pumped into the fuel nozzle. Water is sprayed into the compressed air prior to entering the nozzle. Compressed air and water are directed between the interior and exterior pressure vessels so that the water cools the walls of the interior vessel and is turned to compressed steam. A mixture of steam, compressed air and fuel is formed at the fuel nozzle and is directed into the combustion chamber where it is ignited by an ignitor to produce a high temperature high pressure gas. The high temperature high pressure gas is directed into a dynamic rotor cylinder where its pressure eccentrically rotates a dynamic rotor which is in turn coupled to an output shaft.

2 Claims, 17 Drawing Figures

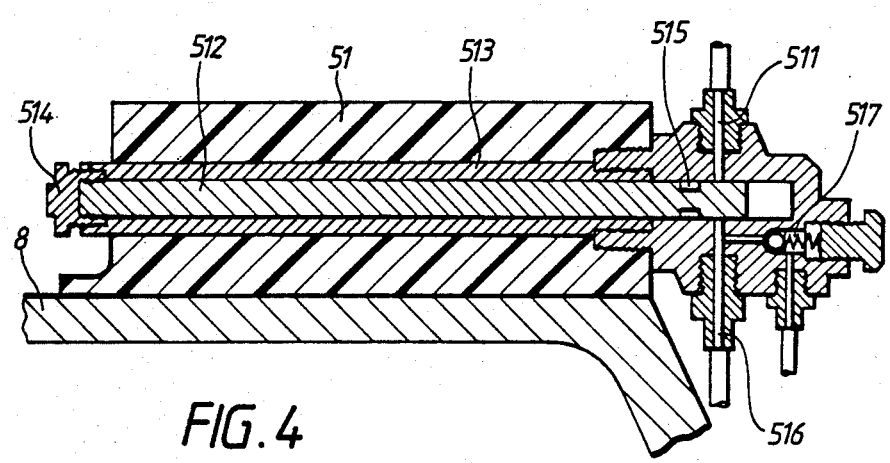
FIG. 4
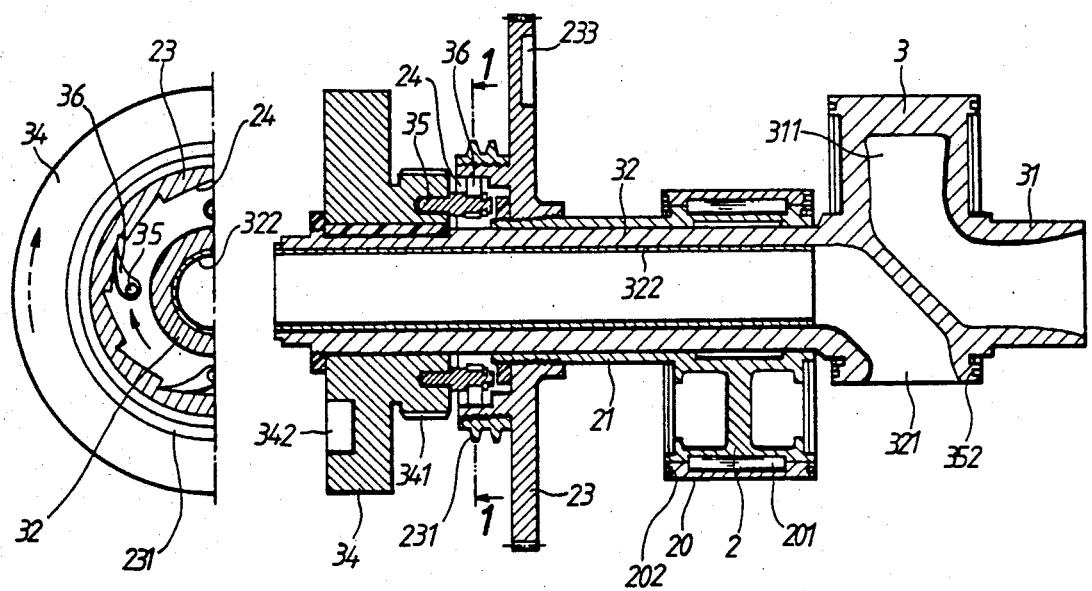
FIG. 5B
FIG. 5A

CLOSED PASSAGE TYPE EQUI-PRESSURE COMBUSTION ROTARY ENGINE

BACKGROUND AND SUMMARY OF THE INVENTION

The conventional dynamic engines mainly include the reciprocating engine, the rotary engine and the turbine engine. The reciprocating engine possesses a very large volume, a complicated structure and a thermal efficiency under 28%. The representative rotary engine is the Wankel engine. The eccentricity of its eccentric shaft is too small, the moment of force which it provides is too small also, and its thermal efficiency is only about 26%. The rotating speed of the compressive vane of a turbine engine must reach 30,000 rpm before it can produce an effective compressive ratio, and the compressive vane directly accepts the counter force of expansion gas in the combustion chamber therefor. Its thermal efficiency is only about 30%. The reason why the thermal efficiency of each of these engines is low is discussed hereafter.

In operation, each of these kinds of engines will produce high levels of heat which affects the normal operation. The heat can be reduced by a cooling method, but the heat absorbed in the cooling method can directly cause a cooling loss of the engine, and this cooling loss will be up to 30%. Furthermore, waste gas exhausted from the engine still possesses very high heat energy, but this high heat energy can exhaust continuously during operation of the engine, and thus will cause a very large loss of heat energy called an exhaust loss. According to experiment, the exhaust loss of every kind of engine is about 32%. The so-called mechanical loss of a turbine engine is due to its compressive vane being of an open type design, the combustion chamber being connected with the outside through the space of the compressive vane, and the requirement that the compressive vane must possess a rotating speed of at least 30,000 rpm in order to produce an effective compressive ratio. The compressive vane directly accepts the counter force of expansion gas in the combustion chamber and exhausts the large quantity of output dynamics from the dynamic vane. This mechanical loss is about 50% and is the largest loss in every kind of engine.

Recognizing the above drawbacks, the purpose of the present invention is to provide a design of a highly efficient rotary engine structure, whose concept of design is to possess the merits of each of the above-noted engines, and to improve on the various drawbacks thereof in structure, in a rotary type engine possessing a small volume, a light weight, and having moving parts which perform pure circumferential motion so that their mechanical effectiveness is high. In the invention, energy is to be converted in the brief steps of compression, combustion, and expansion of the turbine engine.

The mode of performance of the engine is to use an inner water spray cooling method. After absorbing high levels of heat during combustion, cooling water will convert the heat into useful high pressure steam. This method can avoid cooling loss, and completely mix the steam with fuel to be misted prior to combustion and thereby cause the mixed gas to completely burn.

BRIEF DESCRIPTION OF THE DRAWINGS

FIG. 4 is a cross-sectional view of the water flow controller.

FIG. 5A is a cross-sectional view of a one-way driving device of the present invention.

FIG. 5B is a partial cross-sectional view of the driving device of FIG. 5A taken along the line 1—1.

DETAILED DESCRIPTION OF THE PREFERRED EMBODIMENT

The structure of the present invention mainly includes a compressive mechanism, a combustion mechanism and a dynamic transmission mechanism which are described as follows:

COMPRESSIVE MECHANISM

Figure 1:
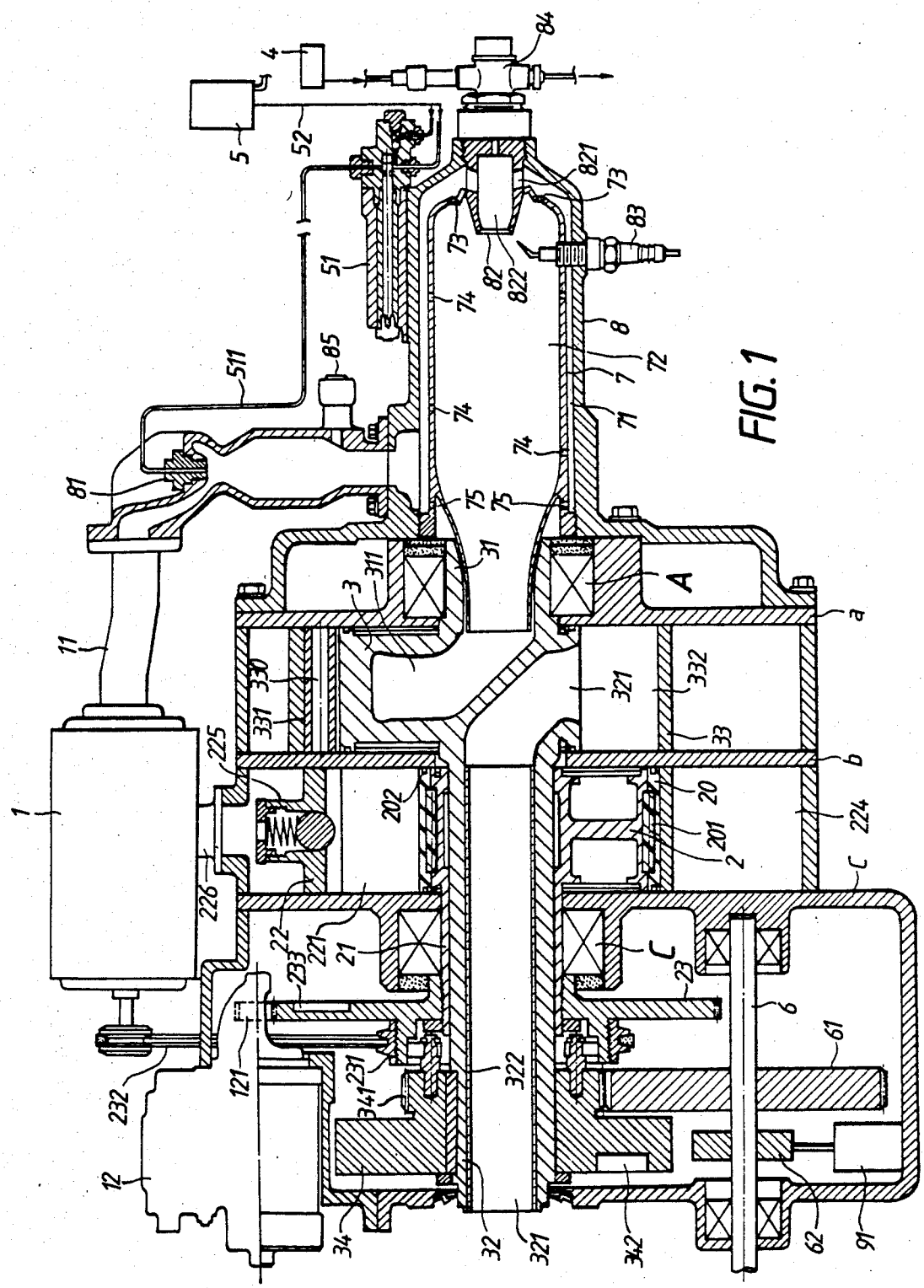
FIG. 1 is a cross-sectional view of the combination of the present invention.

FIG. 1 is a cross-sectional view of the overall combination of the present invention. The compressive mechanism of the present invention includes compressor 1, compressive rotor 2, dynamic rotor 3, fuel pump 4 and water pump 5. Compressive rotor 2 is of a pure cylindrical type. Rotor 2 is provided eccentrically on a hollow shaft 21 mounted on a long shaft 32. At the outer circumferential surface of compressive rotor 2, there is assembled an outer ring 20, and between outer circumferential surfaces of outer ring 20 and compressive rotor 2, there is provided a ring of rigid rolling pins 201 which is used as a rolling contact interface. At each of the two end faces of outer ring 20, there is provided a sealing ring 202 which is used as a sealing device.

Dynamic rotor 3 is also of a pure cylindrical type and is eccentricly integrally formed on adjacent ends of long shaft 32 and a short shaft 31 colinear with long shaft 32, both of the two shafts being hollow and communicating with the inner part of rotor 3. Two unconnected passages separated by an inclined partition are formed in the shafts, one being an intake passage 311 in shaft 31 and the other being an exhaust passage 321 in shaft 32. In the exhaust passage 321, there is provided a heat-insolating porcelain pipe 322 which is used for isolating heat.

The compressive rotor 2 is sleeved by hollow eccentric shaft 321 over the long shaft 32 of dynamic rotor 3. Compressive rotor 2 and dynamic rotor 3 are sealed by side covers a, b, and c, wherein side covers a and c are respectively formed of a flange and a bearing. In the flanges of covers a and c, there are respectively assembled a main bearing A and a main bearing C to support the short shaft 32 of dynamic rotor 3 and shaft 21 of compressive rotor 2, whereby compressive rotor 2 and dynamic rotor 3 can respectively and smoothly make eccentric rotation in the compressive cylinder 22 and dynamic rotor cylinder 33.

On the free end of shaft 21 of compressive rotor 2, there is assembled a starting geared disk 23. On the geared disk 23, there is attached a belt pulley 231, 232 which is connected with air compressor 1, fuel pump 4 and water pump 5 by the belt 232 and rotated together. Starting geared disk 23 is used for starting and is driven by gear 121 of starting motor 12. In the starting geared disk 23, there is formed a weighted concavity 233 which is used for balancing the weight of compressive rotor 2. At the free end of long shaft 32, there is provided a dynamic rotor flywheel 34 in which there is provided a driving gear 341 to engage with a gear 61 on a dynamic output shaft 6, and to transmit dynamics (rotational energy) produced by dynamic rotor 3. Between the starting geared disk 23 and the dynamic rotor flywheel 34, there is provided a one-way driving mechanism, and in the dynamic rotor flywheel 34, there is formed a weighted concavity 342 for balancing the weight of dynamic rotor 3.

Figure 2:
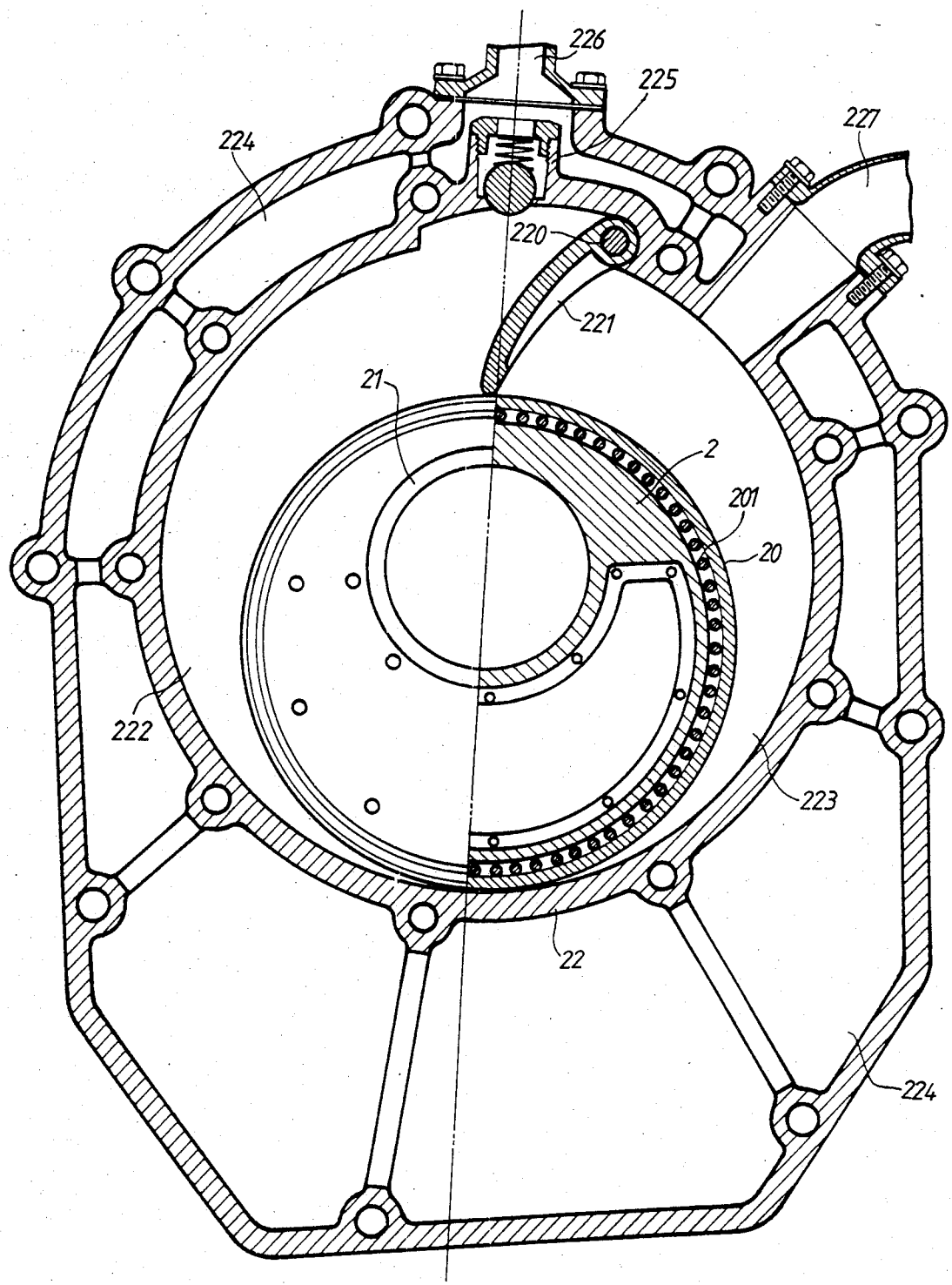
FIG. 2 is a cross-sectional view of the compressive rotor and compressive cylinder of the present invention.

Compressive rotor 2 makes eccentric rotation in compressive cylinder 22 in order to compress air, as shown in FIG. 2, on the wall of the cylinder. A pivot 220 is used to pivotally connect a compressive valve plate 221 to cylinder 22 and provide compressive cylinder 22 into two unconnected gas chambers 222 and 223. Compressive valve plate 221 can be centered by pivot 220 to swing and transfer properly.

The space surrounding the outer cylindrical surface of compressive cylinder 22, inside the eccentrically surrounding outer cylinder wall of cylinder 22 is divided into several connected gas containing chambers 224. A one-way valve 225 is provided through cylinder 22 into the small volume chamber 224, and high pressure gas, after being compressed, can be stored in gas containing chambers 224 through gas chamber 222, but cannot flow in reverse into gas chamber 222. In the outer ring circumferential wall of compressive cylinder 22, there is provided a guide pipe 226 to transmit high pressure air from gas containing chamber 224 into compressor 1 for secondary compression. The above-mentioned compressive valve plate 21 closely contacts the outer ring 20 on the outer circumferential surface of compressive rotor 2. Since at the outer circumferential surface between outer ring 20 and compressive rotor 2, there are provided the rigid rolling columns 201 which are used as a friction interface, the rotating speed of outer ring 20 is less than that of the compressive rotor, thereby reducing frictional energy loss caused by friction between outer ring 20 and compressive valve plate 221.

Figure 3:
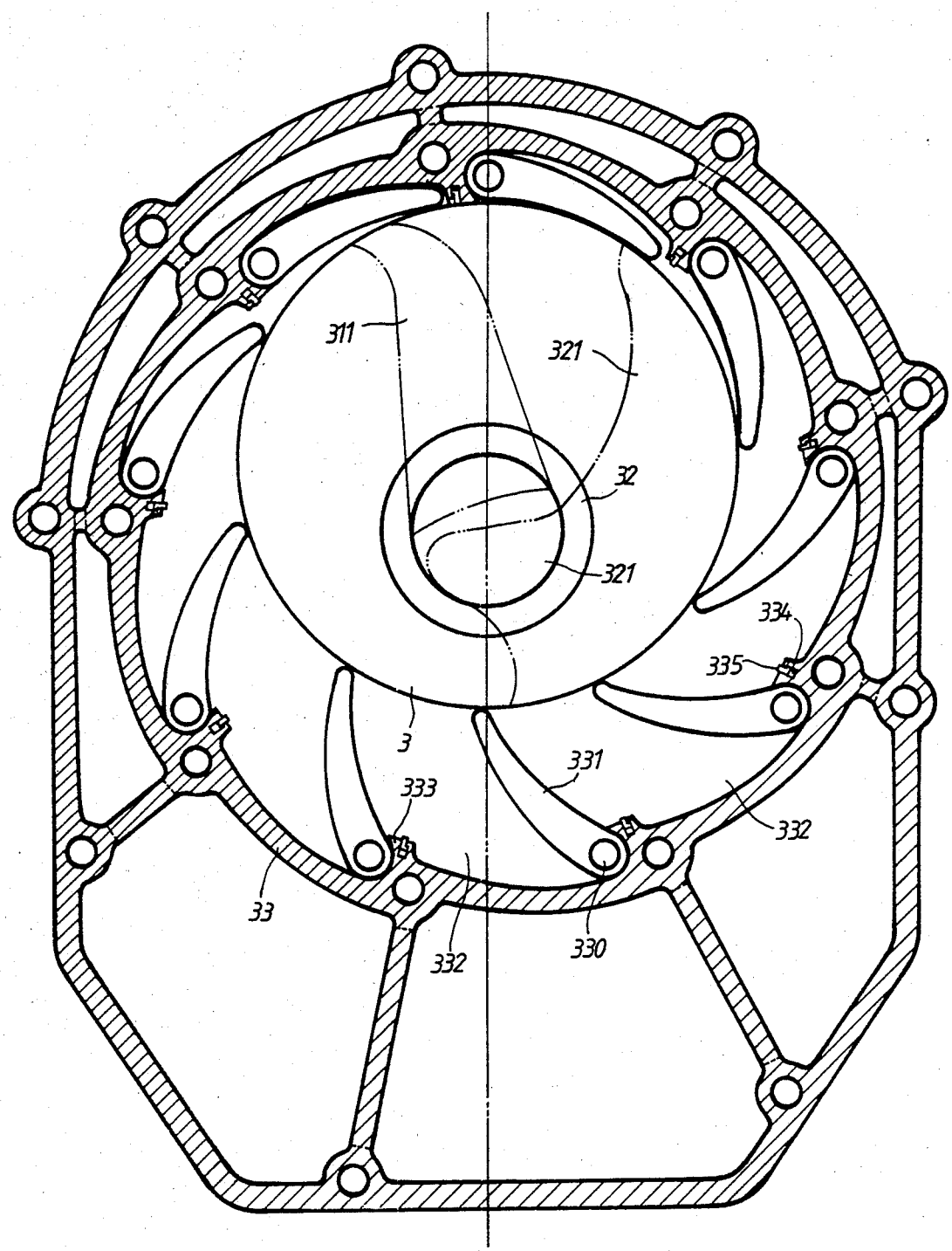
FIG. 3 is a cross-sectional view of the dynamic rotor and the cylinder of the dynamic rotor of the present invention.
Figure 6:
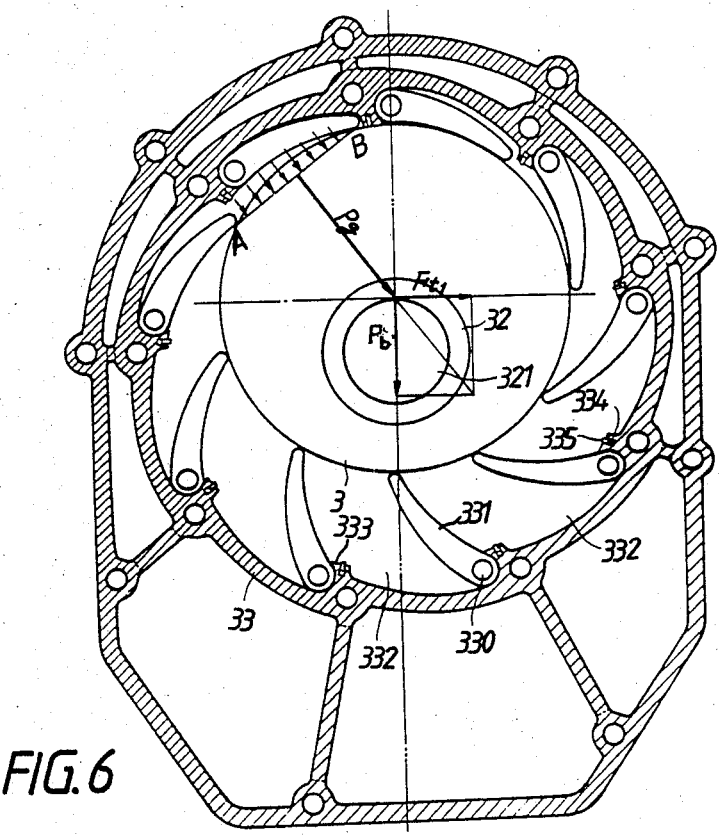
FIGS. 6–9 are figures similar to FIG. 3 at different stages of operation and illustrating a torque analysis of the present invention.
Figure 7:
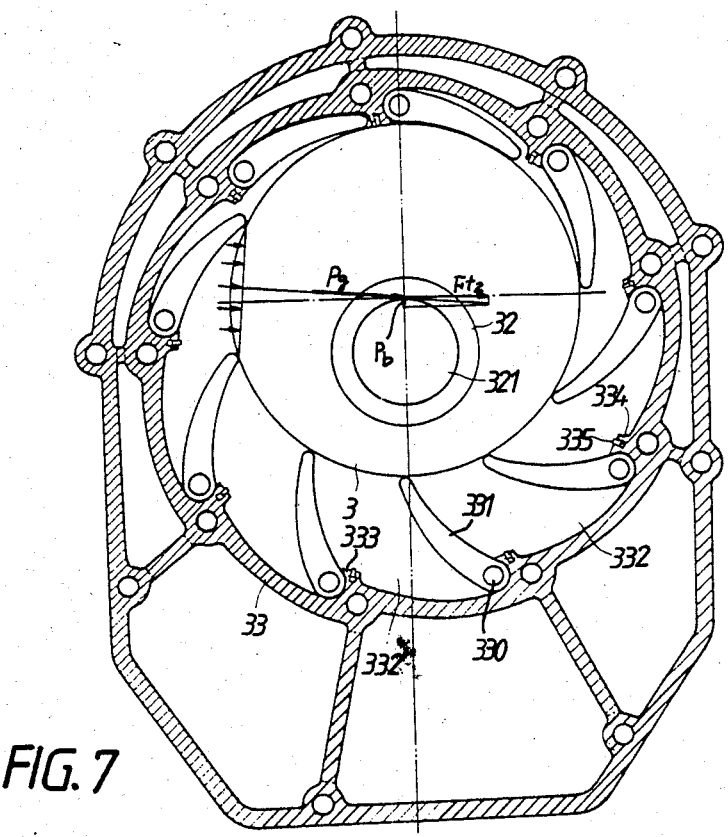
Figure 8:
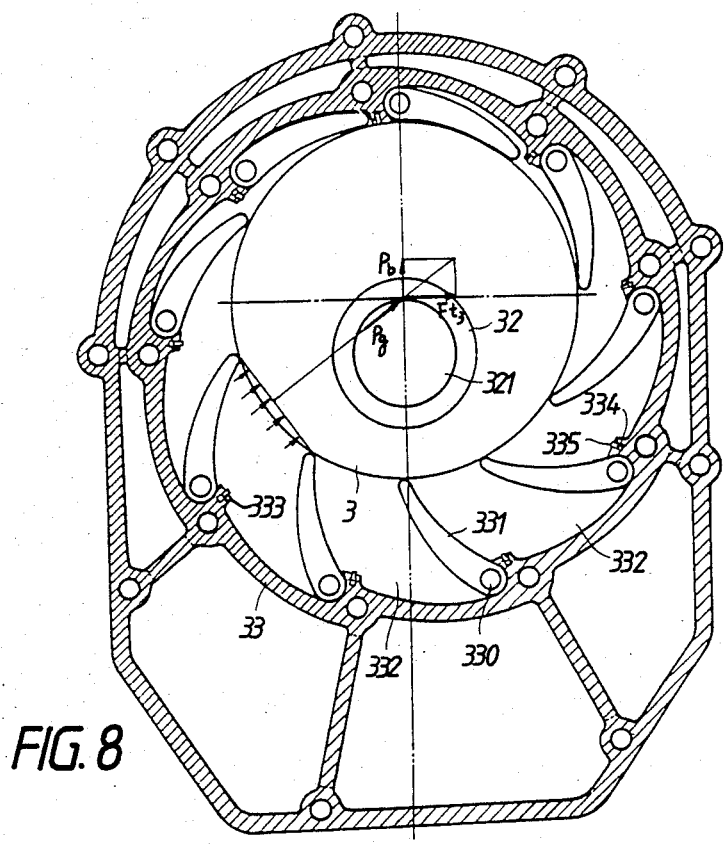
Figure 9:
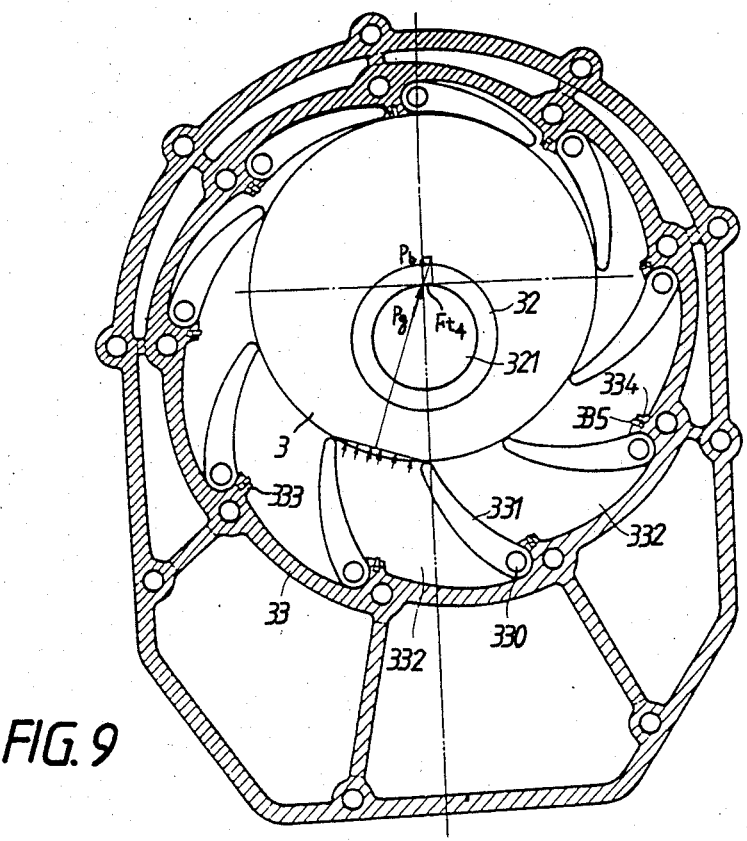
Figure 13:
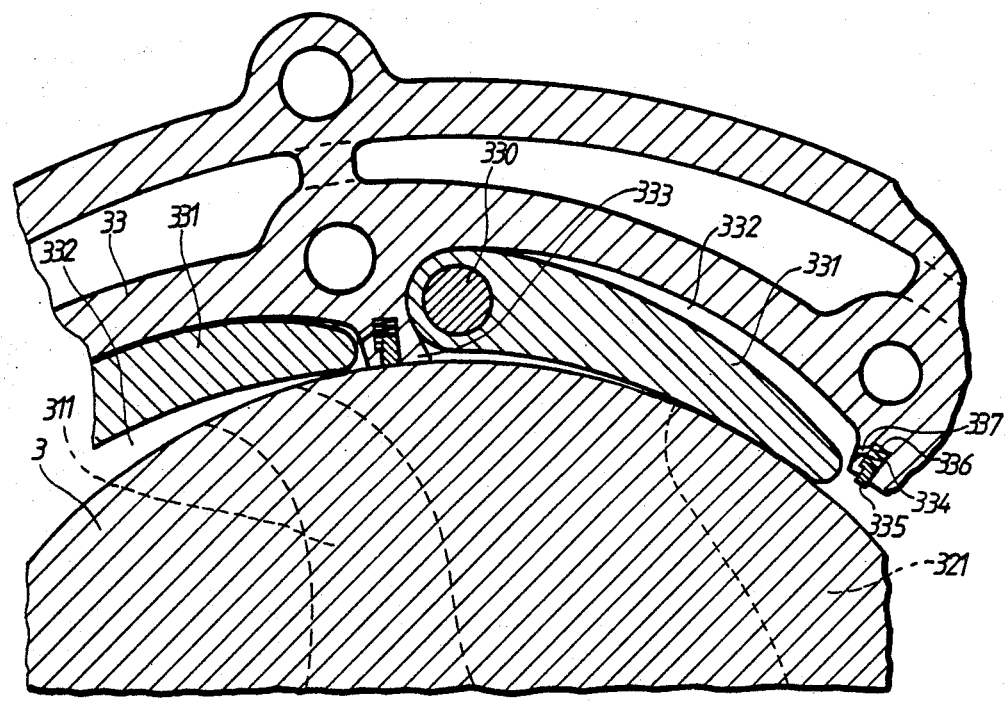
FIGS. 13 and 14 are partial cross-sectional views of the sealing body in the dynamic rotor illustrating its function.
Figure 14:
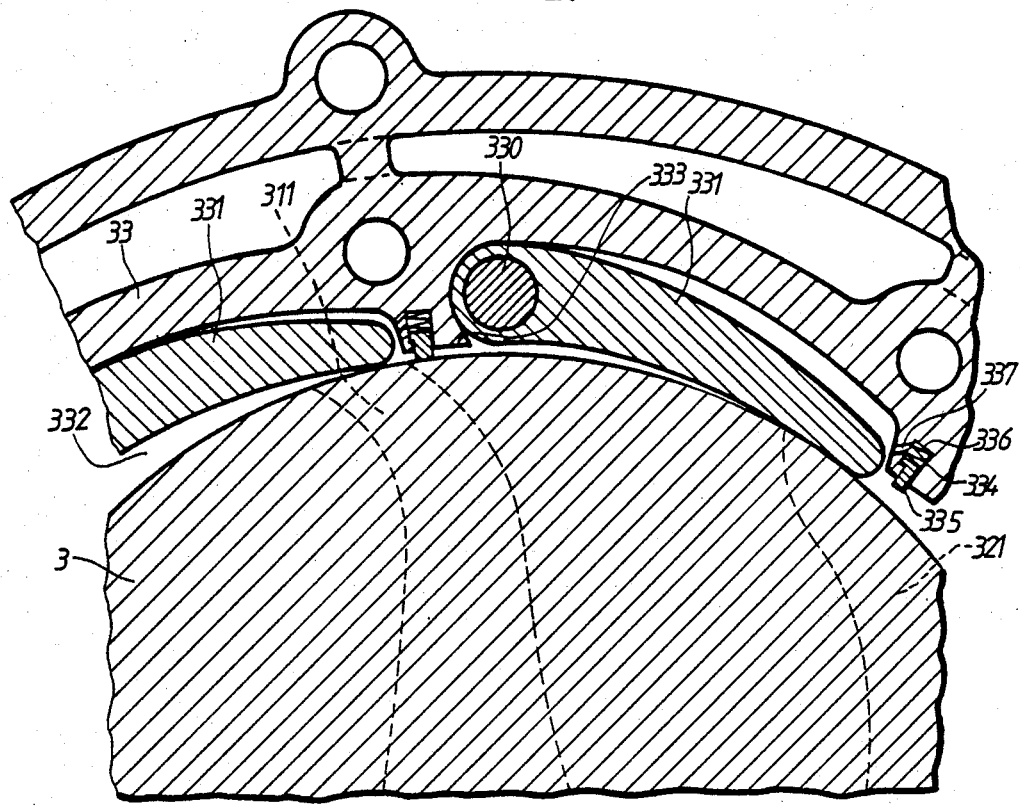

Dynamic rotor 3 is surrounded by several dynamic valve plates 331 pivotally mounted at certain intervals along the inner circumferential wall of dynamic rotor 33, as shown in FIG. 3. The dynamic valve plates 331 are pivotally mounted on the circumferential wall by pivots 330, and each dynamic valve plate 331 can be centered by a pivot 330 to swing and transfer properly. Through the placement of each dynamic valve plate 331, the circumferential volume between dynamic rotor 3 and dynamic rotor cylinder 33 is divided into several unconnected gas chambers 331. Since dynamic rotor 3 makes eccentric rotation in the dynamic rotor cylinder 33, the volume of the gas chambers 332 at the circumference of dynamic rotor 3 near the top of rotor 3 (its most eccentric part) is smaller than the volume of the gas chamber 332 at other parts. Thus, when dynamic rotor 3 starts to make eccentric rotation, the volume of each gas chamber alternately increases and decreases as the rotor 3 rotates. Referring to FIGS. 3, 13, and 14, the dynamic rotor cylinder 33 has radially inwardly projecting partition parts 333 adjacent the pivots 330. Each partition part 333 has a setting groove 334 through inclined hole 337. The compressive spring 336 acts on the sealing body 335 so that the sealing body is resiliently movable a small distance further into the setting groove 334. Communication between the radially outward end of setting grooves 334 and gas chambers 332 is provided by inclined holes 337 in parts 333 which let high pressure gas enter into the setting groove 334 through inclined hole 337.

Combustion Mechanism

The combustion mechanism of the present invention includes an internal pressure vessel (can) 7, external pressure vessel (can) 8, water nozzle 81, fuel nozzle 82 and plug 83. As shown in FIG. 1, internal pressure can 7 is placed inside the external pressure can 8, space formed in can 8 constituting a steam generating chamber 71. The space inside internal pressure can 7 comprises a combustion chamber 72. The open end portion (left side portion in FIG. 1) of said can 7 extends through shaft 31 into intake passage 311 of dynamic rotor 3, thereby providing communication between combustion chamber 72 and intake passage 311.

External pressure can 8 closely joins with side a. The water nozzle 81 and a water flow controller 51 (as shown in FIG. 4) are mounted on the can 8. A source of water to the water nozzle 81 is provided by a guide pipe 52 connected to water flow controller 51 from water pump 5, and a guide pipe 511 connecting controller 51 to water nozzle 81. Compressor 1 is connected by a guide pipe 11 to water nozzle 81 to guide high pressure gas to water nozzle 81 when water is injected from water nozzle 81 into steam generating chamber 71. High pressure air is also injected into chamber 71, whereby the water enters chamber 71 as a mist. When the mist contacts the high temperature internal pressure can 7 and then becomes a high pressure steam, part of the steam enters the combustion chamber 72 through front osmosis hole 73, peripheral osmosis hole 74 and rear osmosis hole 75 of pressure can 7.

Another part of the steam enters into fuel mixing chamber 822 through penetrated hole 821 of fuel nozzle 82 and mixes with injected fuel to become mixed gas, and then is injected through nozzle 82 to combustion chamber 72 where the mixture is ignited by plug 83. The fuel nozzle 82 penetrates external pressure can 81 and extends into internal pressure can 7, and is connected to a fuel controller 84 which controls the feed of fuel. Fuel is fed and pumped through controller 84 into nozzle 82 by fuel pump 4. Water nozzle 81 has connected thereto a snifting valve 85 which is set to open when the pressure in nozzle 81 is over a preset safety pressure value and release pressure in order to ensure safe operations.

The assembly of water flow controller 51 of the present invention, as shown in FIG. 4, includes an aluminum bar 512 screwed into a copper pipe 513 by screw nut 514 at the open end of pipe 513. The screw nut 514 permits adjustment of the bar 512.

The coefficient of expansion of aluminum bar 512 is 23.8 which is larger than the coefficient of expansion of copper pipe 513 which is 14.1. Therefore, when the fuel starts to ignite and the engines starts to operate, and copper pipe 513 begins to absorb heat, aluminum bar 512 will also indirectly absorb heat from copper pipe 513, but since the coefficient of expansion of aluminum bar 512 is larger, it expands in copper pipe 513 axially away from screw nut 514 until the concave hole 515 in the aluminum bar 512 is aligned with guide pipe 511 thereabove and a passage 516 therebelow. With such alignment, groove 515 becomes a flow passage for water, and water pumped out by water pump 5 can flow therethrough to water nozzle 81.

The temperature at which expansion of aluminum bar 512 aligns the concave hole 515 with the passage 516, can be adjusted and set as requirements demand. Usually, aluminum bar 512 starts to expand and extend when external pressure can 8 reaches 200° C. When it does not reach said temperature, water pumped by water pump 5 will flow back into water pump 5 through a one-way valve 517 because passage 516 is not open. The concave hole 515 of aluminum bar 512 moves to gradually open passage 516 as the temperature of the external pressure can increases and thus the bar 512 serves to control the adjustment of the water supply.

Dynamic Transmission Mechanism

The dynamic transmission mechanism of the present invention includes starting geared disk 23, dynamic rotor fly wheel 34 and dynamic output shaft 6. As mentioned above, starting geared disk 23 is used to start the engine. When commensing to start the engine, starting geared disk 23 is driven by the starting motor to drive compressor 1 to compress air, and let dynamic rotor 3 start to perform work to transmit rotative energy. However, between the starting geared disk 23 and dynamic rotor fly wheel 34 at the free end of long shaft 32 of dynamic rotor 3, there is provided a one-way driving device. Therefore, before the dynamic rotor 3 starts to transmit rotative energy, the compressive rotor 2 is in a static condition. Until the dynamic rotor 3 starts to rotate and transmit rotative energy, the starting geared disk 23 will operate continuously through the one-way driving device, and the rotative energy transmitted from dynamic rotor 3 will be transmitted out to dynamic output shaft 6 through dynamic rotor flywheel 34. After starting geared disk 23 is driven by dynamic rotor flywheel 34, the starting motor will seperate from the starting geared disk 23 and stop driving.

The one-way driving device is shown in FIG. 5, wherein at one end of starting geared disk 23 corresponding to dynamic rotor flywheel 34, there is provided a concave toothed hole 23, and at one end of dynamic rotor flywheel 34, pivots 35 pivotally fix several pins 36 in a same rotational direction. The pins 36 can rotate in one direction and engage with toothed hole 24 of starting geared disk 23. When starting geared disk 23 drives compressor 1 and compressive rotor 2 and rotates in the designed direction (as shown by the arrows in FIG. 5B), dynamic rotor fly wheel 34 will not be driven because pin 36 rotates in one direction. Therefore, dynamic rotor flywheel 34 is also static. When dynamic rotor 3 starts to operate and drive co-axial dynamic rotor flywheel 34 to rotate along the designed direction (as shown by the dotted line arrow in FIG. 5B), pins 36 engage toothed hole 24 of starting geared disk 23 and let starting geared disk 23 be driven to operate, and the starting geared disk 23 is further linked with compressor 1 to operate continuously (it substitutes for starting motor 12) and compresses air continuously, and rotative energy produced by dynamic rotor 3 is transmitted out through dynamic output shaft 6.

The description of the structure of the present invention being as described above, the operation of the invention is described as follows:

Starting

The starting of the present engine is initiated by closing the battery circuit to starting motor 12 and plug 23. Then starting motor will begin to drive starting geared disk 23, and plug 83 will continuously discharge to ignite the fuel gas mixture. When starting geared disk 23 starts and operates, it also drives air compressor 1 simultaneously, and fuel pump 4 and water pump 5 respectively begin to pump fuel and water to fuel nozzle 82 and water nozzle 81, respectively. Compressive rotor 2 continuously draws fresh air from outside of the engine into gas chamber 223 through absorptive hole 227, and after being compressed by compressive valve plate 221, it is stored in the gas containing chamber 224. After gas containing chamber 224 is full of high pressure air, high pressure air will enter air compressor 1 through guide pipe 226 and be compressed therein still further. High pressure air from compressor 1 is then guided by guide pipe 11 to fuel nozzle 81 and enters steam generating chamber 71. As mentioned above, when starting geared disk 23 starts, it simultaneously drives pump 4 to pump fuel to fuel controller 84 which adjusts and controls the amount of fuel which enters fuel mixing chamber 822. At that time, part of the high pressure air injected into steam generating chamber 71 will enter combustion chamber 72 for cooling through osmosis holes 73, 74 and 75. However, most of the air will enter fuel mixing chamber 822 through penetrated hole 821 and mix with the injected fuel to form a high pressure gas/fuel mixture which is injected into combustion chamber 72 where it is ignited by plug 83 to produce high pressure igniting and combustion gas which immediately enters intake passage 311 of dynamic rotor 3 from the end of combustion chamber 72, and flows into the smallest of the gas chambers 332 where it applies to the circumferential surface of dynamic rotor 3 a rotation force thereby to cause dynamic rotor 3 to rotate forward and perform work (see FIG. 10). Rotation of dynamic rotor 3 drives dynamic rotor flywheel 34 to transmit rotational energy out through dynamic output shaft 1, and thereby substitutes for starting motor 12 through linking with the one-way driving device and drives the compressor 1 to operate continuously. Therefore, the whole engine will be operating.

While the engine is being started, water pump 5 begins to pump water continuously to water flow controller 51, but due to the water flow passage 516 of water flow controller 51 not being opened, all the water flows back to water pump 5 through one-way valve 517. After the engine has rotated for a period of time, its temperature will gradually rise to a designed temperature (200° C.), the aluminum bar 512 will begin to expand and extend after being heated, concavity 515 will become aligned with passage 516, and water pumped by water pump 5 will flow to water nozzle 81 and be ejected therefrom into steam generating chamber 71. Water mist ejected from water nozzle 81 mixes with high pressure air compressed by air compressor 1, at water nozzle 81 and enters steam generating chamber 71, cools internal pressure can 7, and develops a large volume of steam. The main air current of the large volume of steam passes through hole 821 of fuel nozzle 82 and enters fuel mixing chamber 822 where it mixes with fuel to become a fuel/gas mixture and is then injected into combustion chamber 72 and is ignited by plug 83.

The second air current is separated into three streams. The first stream enters combustion chamber 72 through front osmosis holes 73 and forms a surrounding convection current so as to protect the internal pressure can 7 by isolation of the walls of the can from the heat, and to aid further burning of the combustion gas to reach complete combustion and thereby promote thermal efficiency and cleaner exhaust. The second stream enters combustion chamber 72 through peripheral osmosis holes 74 and protects the rear part of internal pressure can 7. The second stream also lowers the temperature of combustion gas below 1,000° C. The third stream infiltrates bearings A through rear osmosis hole 75 to cool the bearings A and further lower the temperature of combustion gas entering dynamic rotor 3 to about 500° C.

The side surface of internal pressure can 7 is protected by the infiltrated steam while the outside is cooled by the fluid in steam generating chamber 71. Therefore, steam generating chamber 71 can accept combustion at a very high temperature, and limit combustion gas to the core (central) part. Moreover, the can 7 receives a low external temperature and can therefore maintain its strength and accept stronger combustion pressure from within.

Loading Operation

After starting, the engine will function normally, and also there is enough air being continuously transmitted into combustion chamber 72. If the user now depresses the accelerator, the engine will operate rapidly. The operation of pumping oil is the same as in a reciprocating engine. If the user actuates the clutch, the action of filling oil will be started, and the engine will be in the loading operation stage.

Stop Operation

When the engine is stopped, firstly, it must decelerate (reduce oil). The clutch is disengaged simultaneously, and the engine rotates without performing work. The engine will be stopped after the fuel is completely cut off.

The principle of operation and other structural characteristics of the present invention will be described as follows:

Analysis of Torque, Eccentricity and Applied Force, and Dynamic Overlap

Referring to FIGS. 6-9, the pressure of expansive gas in the small gas chamber 332 will press on the surfaces A, B of dynamic rotor 3. The resultant force Pg is directed toward the center of rotor 3. The force at the center may be divided into two components Pb and Ft1. Force Pb is directed radially toward the center point of the rotating shaft 31 and constitutes a useless force loaded on the bearing. Force Ft1 is directed tangent to the rotating shaft and thus rotates the shaft. The distance from the mandrel of the eccentric axle of rotor 3 to the center of dynamic rotor cylinder 33 is the arm of force e of the rotating shaft (the eccentricity of the rotating shaft). Therefor, the moment of the engine $Md = Ft1 \times e$. If the effective tangential forces of other gas chambers are respectively Ft2, Ft3 and Ft4, then the effective torsion of the present engine $Ft = Ft1 + Ft2 + Ft3 + Ft4$, of the total torsion is given by $Md = Ft \times e$. Therefore, it can be seen that under a same gas pressure the main factors affecting the efficiency of the engine are the arm of force e and the working direction of the gas.

The procedure of compression, combustion and expansion of the present engine is based on the turbine engine method. The engine has a closed passage system and performs continuous equi-pressure combustion. When high pressure gas in combustion chamber 72 passes through intake passage 311 and is successively distributed into the then small gas chamber 332, the corresponding dynamic valve plate 331 will seal and isolate the small gas chamber 332 from the outside because of the application of pressure on dynamic valve plates 331. When the small gas chamber 332 and combustion chamber 72 are connected, high pressure gas in combustion chamber 72 continuously flows into the connected small gas chamber 332. Therefore, pressure in small gas chamber 332 becomes the same as the pressure in combustion chamber 72, and both of these pressures are the highest pressures. Therefore, the effectiveness of the present invention is superior to that of a conventional engine.

Sealing Device

Figure 10:
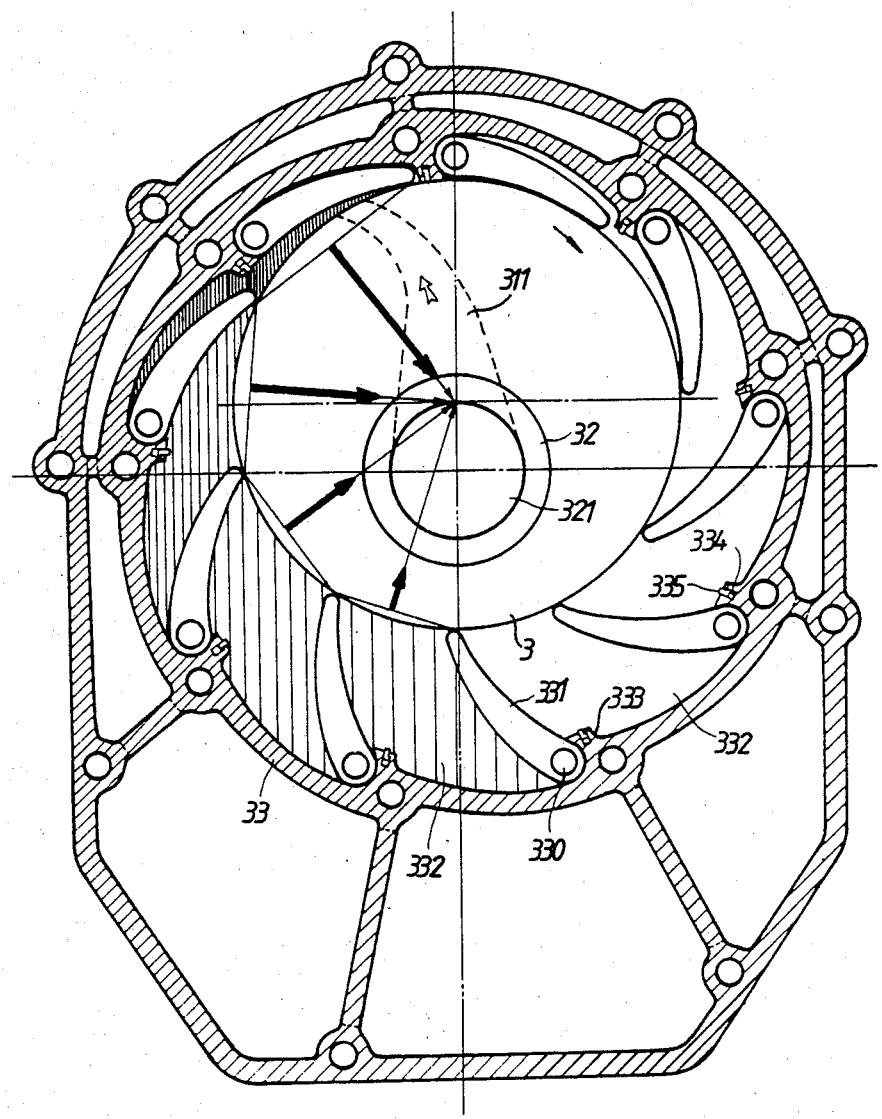
FIG. 10 is a comparison of view of in cross section of the gas chamber pressure in the dynamic rotor cylinder of the present invention.
Figure 11A:
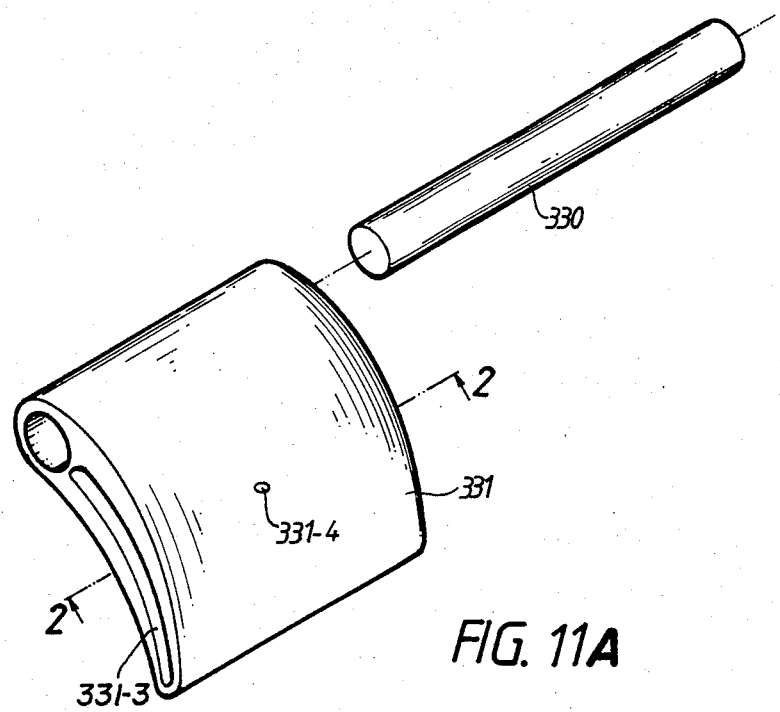
FIG. 11A is an exploded view of the dynamic valve plate sealing device of the present invention.
Figure 11B:
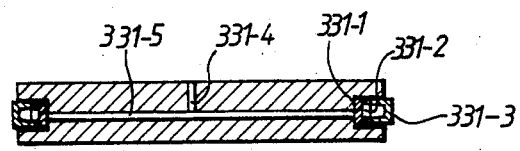
FIG. 11B is a cross-sectional view of the device of FIG. 11A taken along line 2—2.
Figure 12:
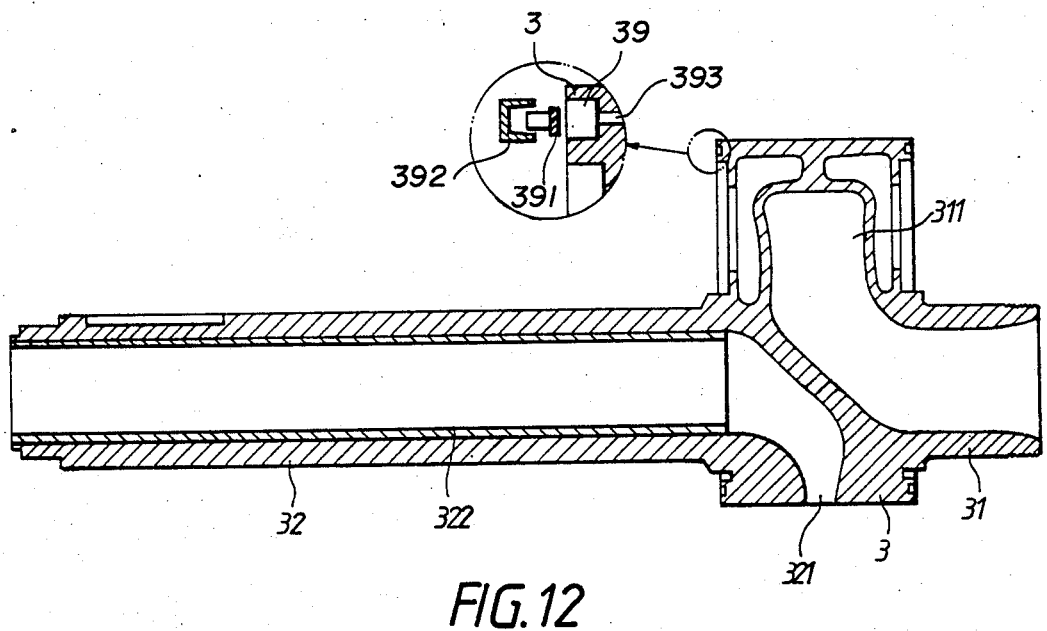
FIG. 12 is a cross-sectional view of the dynamic rotor sealing device of the present invention.

Dynamic valve plate 331 and compressive valve plate 221 respectively contact dynamic rotor 3 and compressive rotor 2, and at the respective contact parts, there is no sealing device. As to the sealing valve 331, during expansion of the gas in gas chambers 332, the volume of each gas-filled gas chamber expands and thus pressure in the small gas chamber is larger than the pressure in the next larger gas chamber and so on, as illustrated in FIG. 10. Therefore, the valve plates 331 are pivotally pressed against dynamic rotors by the differential pressure in adjacent gas chambers 332 and thus the contact sealing function performed by dynamic valve plates 331 and dynamic rotor 3 is good and precise. For ensuring the pneumatic sealing effect between each separated gas chamber, the pneumatic sealing of gas chambers 332 can be obtained by providing at two sides of each valve plate 331 and at the end surface at two sides of dynamic rotor 3, a sealing ring. See FIGS. 11A, 11B and 12. In FIGS. 11A and 11B, at the two sides of dynamic plate 331, there are respectively provided an arc groove 331-1. In each groove, there is placed a compressive spring 331-2 and a valve side sealing body 331-3. On the surface of dynamic valve plate 331, there is provided a gas hole 331-4. Gas hole 331-4 is connected to a gas hole passage 331-5 which extends transversely through valve plate 331 and is connected at opposite ends with the respective grooves 331-1. Therefore, some high pressure gas in the small gas chamber 332 will flow from gas hole 331-4, through gas hole passage 331-5 and enter into groove 331-1, and push outwardly against sealing bodies 331-4 so that the latter move outwardly and closely seal against the side covers a and b to thereby provide an effective pneumatic seal.

In accordance with the same principle, at the two side surfaces of dynamic rotor 3, there are also provided respective ring shape grooves 39. In each groove 339 there is placed a ring type wave plate spring 391 and a sealing ring 392, and at the bottom of each groove 39, there is provided a gas hole 393 which is connected to intake passage 311 of dynamic rotor 3. Gas holes 393 can direct high pressure gas to press the sealing rings into a closely sealing relationship with the side covers a and b.

The sealing devices of compressive valve plate 221 are the same as those of dynamic valve plate 331. On the outer circumferential surface of compressive rotor 2, there is provided the outer ring 20, and on the two side end surfaces of the outer ring 20, there are provided respective sealing rings 202 which are used as sealing devices which function in the same manner as the sealing rings 352 at the two side end surfaces of dynamic rotor 3, in order to provide an effective pneumatic seal.

Thd dynamic rotor cylinder 33 of the present invention possesses respective partition parts 333 adjacent to the pivots 330 of dynamic valve plate 331. Each partition plate 333 has a setting groove 334 in which a sealing body 335 is provided. When dynamic rotor 3 eccentrically rotates in dynamic rotor cylinder 33, the most eccentric point of the dynamic rotor 3 rotates to the location between the two gas chambers 332 where the sealing body 335 is provided (as shown in FIG. 13). At this time, one gas chamber 332 is connected with intake passage 311 of dynamic rotor 3 for gas intake and another (adjacent) gas chamber 332 connects with exhaust passage 321 of dynamic rotor 3 for gas exhaust.

Therefore, at this point, pressures in the two neighboring gas chambers 332 differ widely. In order to prevent leakage of high pressure gas from the higher pressure gas chamber 332 to the neighboring lower pressure gas chamber 332 which would cause exhaust loss, there is provided the above-mentioned sealing body 335 in dynamic rotor cylindner 33. Usually, sealing body 335 is pushed by the tension of compressive spring 336 and extends into dynamic cylinder 33. When the highest point of dynamic rotor 3 moves to the position of partition part 333, sealing body 335 is pushed by dynamic rotor 3 back into the setting groove 334, but due to the tension of compressive spring 336, it closely contacts the outer circumferential surface of dynamic rotor 3. Then, a small portion of the high pressure gas in the higher pressure gas chamber 332 enters the setting groove 334 from inclined hole 337 in order to increase the force on the sealing body 335 against rotor 3 and thusly, the sealing body 335 is completely sealed against the dynamic rotor 3, and can effectively prevent high pressure gas from leaking from the higher to the lower pressure gas chamber 332 as illustrated in FIG. 14. The bottom end face of the above sealing body 335, which contacts dynamic rotor 3, can be provided with an arc corresponding to the outer circumferential surface of the dynamic rotor 3 in order to further improve the seal between dynamic rotor 3 and sealing body 335.

Lubrication System

Figure 15:
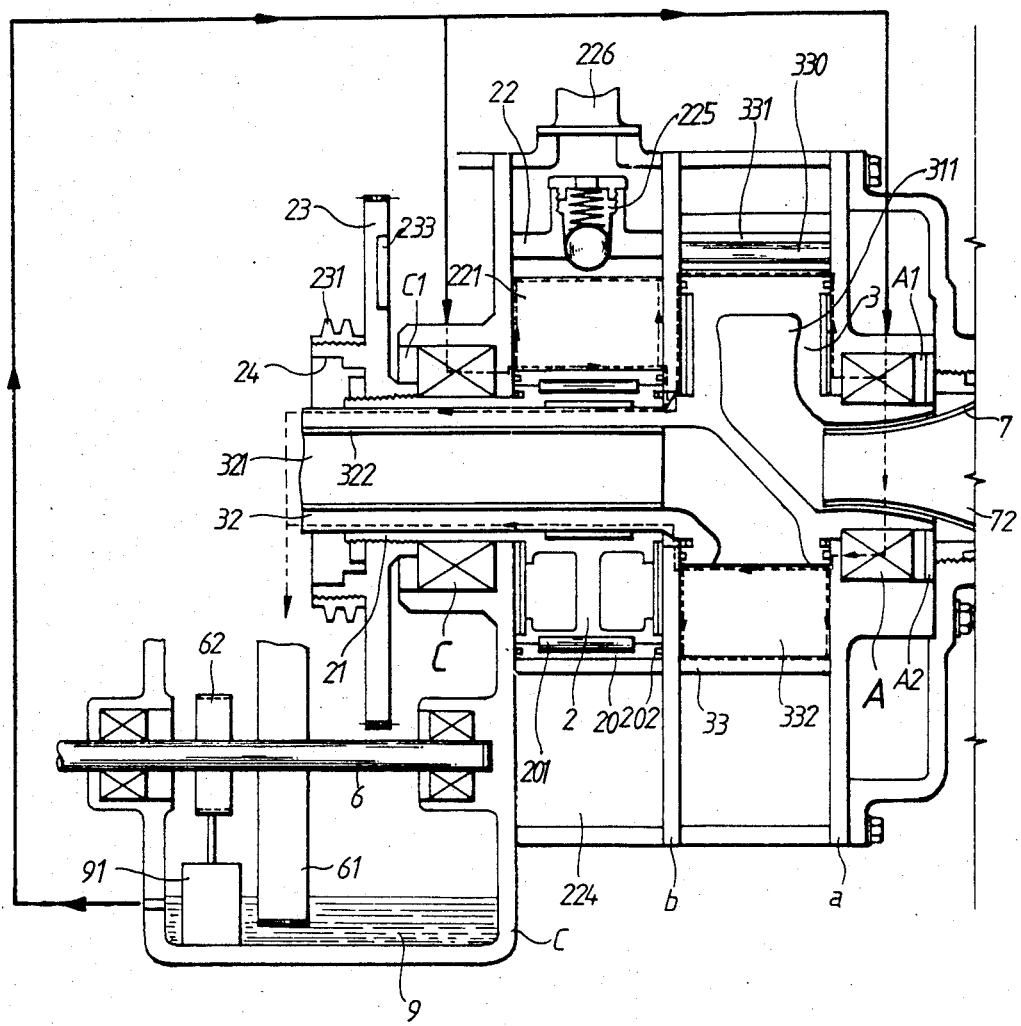
FIG. 15 is a partial schematic view of the lubrication oil passage of the present invention.

The lubrication system of the present invention uses the method of compulsory lubrication. The lubrication system of the present invention as illustrated in FIG. 15, possesses an axial lubrication return passage and a radial type lubrication passage which are described as follows:

Axial Lubrication Return Passage

At the bottom of oil tank 9, there is provided an oil pump 91 driven by an inclined gear 62 of dynamic output shaft 6. At the outside of main bearing A, there is a gas seal A1 and an oil seal A2, and at the outside of main bearing C, there is provided an oil seal C1. Oil is pumped out by oil pump 91, and is firstly cooled by a cooler (not shown) and then flows through a filter (not shown) to be filtered and then split and transmitted into main bearings A and B to lubricate main bearings A and B. Lubricant through main bearing A will immediately pass through space between short shaft 31 of dynamic rotor 3 and side cover a and enter into the right side of dynamic rotor 3 to provide lubrication thereto. Lubricant completely lubricates the sealed area at the right side of dynamic rotor 3 and then passes through the top of dynamic rotor 3 to connect through and enter into the left side of dynamic rotor 3 in order to provide lubrication thereto, and then enters the inside of shaft 21 of compulsory rotor 2 through space between side cover b and long shaft 32, in order to lubricate and cool the shaft 21 of compressive rotor 2 and finally flow back to oil tank 9. The lubrication oil passage of lubricant which goes through main bearing C is the same as the oil passage of the above main bearing A which lubricates two sides of compressive rotor 2 in a reverse direction, and meet with an oil passage of main bearing A. The lubricant flows back to the oil tank 9 through the inside of shaft 21 of compressive rotor 2.

Radial Lubrication Return Passage

When lubricant flows to the top face of dynamic rotor 3 and compressive rotor 2, part of the lubricant seeps out from a very small hole to lubricate the valve plate and circumference of the rotor. The lubrication of the pivot part 220 of compressive valve plate 221 can be performed by pumping a small quantity of lubricant.

What is claimed:

1. A rotary engine, comprising:
   means for compressing fresh air;
   an external pressure vessel;
   an internal pressure vessel inside said external pressure vessel, said internal pressure vessel having walls enclosing a combustion chamber therein;
   a fuel nozzle in said walls opening into said combustion chamber;
   means for pumping fuel into said fuel nozzle;
   means for guiding compressed air compressed by said compressing means into said internal pressure vessel;
   means for spraying water into the compressed air guided by said guiding means whereby the compressed air guided into said internal pressure vessel carries the water therewith into said internal pressure vessel, said guiding means including means directing at least a portion of the compressed air and water carried therewith along said wall so as to cool said wall and be converted to compressed steam by heat in said wall and for directing the at least part of the compressed air and steam into said fuel nozzle so as to mix with the fuel pumped into said fuel nozzle to form a compressed air and steam/fuel mixture and be carried therein into said combustion chamber;
   an igniter in said combustion chamber for igniting the fuel in the mixture to produce a high temperature, high pressure gas;
   an output shaft; and
   means for converting the pressure of the high pressure gas produced in said combustion chamber into rotative force applied to said output shaft, said converting means including a dynamic rotor cylinder, a dynamic rotor eccentrically rotatably mounted in said dynamic rotor cylinder, means for directing the high pressure gas produced in said combustion chamber into a high pressure space in said dynamic rotor cylinder so as to press against said dynamic rotor and rotate said dynamic rotor eccentrically in said dynamic rotor cylinder, said dynamic rotor being coupled to said output shaft so as to rotate said output shaft when said dynamic rotor rotates;

said converting means including a hollow shaft, said dynamic rotor being eccentrically fixed to said hollow shaft, said dynamic rotor cylinder having a cylindrical interior surface and having means for, together with said dynamic rotor, separating the space between said dynamic rotor and said cylindrical interior surface into said high pressure space and a low pressure space sealingly separated from said high pressure space;

said hollow shaft having a long hollow shaft portion having a porcelain head-insulating layer formed on the inner surface thereof and defining an exhaust passage on one side of said dynamic rotor, and a short hollow shaft portion defining an intake passage on the other side of said dynamic rotor;

said dynamic rotor having a hollow internal space and an inclined partition in said internal space separating said internal space into a first hollow rotor portion communicating with said high pressure space and the interior of said short hollow shaft portion, and a second hollow rotor portion communicating with said low pressure space and the interior of said long hollow shaft portion, said high pressure gas directing means including said interior of said short hollow shaft portion, said interior of said short hollow shaft portion communicating with said combustion chamber;

said compressing means comprising a compressor, a compressive rotor cylinder, a compressive rotor having a sleeve sleeved over said long hollow shaft portion so as to eccentrically mount said compressive rotor on said hollow shaft for eccentric rotation in said compressive rotor cylinder, means for drawing fresh air into said compressive rotor cylinder, means for rotatively decouplably coupling said starter motor and coupling said dynamic rotor, to said compressive rotor so as to compress the fresh air drawn into said compressive rotor cylinder by rotating said compressive rotor in said compressive rotor cylinder, and means for directing air compressed in said compressive rotor cylinder into said compressor for further compression;

said rotary engine further comprising a first side cover sealingly covering one side of said compressive rotor cylinder, and a second side cover sealingly covering one side of said dynamic rotor cylinder, said first side cover having a first flange and a first main bearing in said first flange rotatively supporting said sleeve and said long hollow shaft portion therein, said second side cover having a second flange and a second main bearing in said second flange rotatively supporting said short hollow shaft portion therein.

2. A rotary engine, comprising:
means for compressing fresh air;
an external pressure vessel;
an internal pressure vessel inside said external pressure vessel, said internal pressure vessel having walls enclosing a combustion chamber therein;
a fuel nozzle in said walls opening into said combustion chamber;
means for pumping fuel into said fuel nozzle;
means for guiding compressed air compressed by said compressing means into said internal pressure vessel, said guiding means including means for directing at least a portion of the compressed air into said fuel nozzle so as to mix with the fuel pumped into said fuel nozzle to form a compressed air/fuel mixture and be carried therein into said combustion chamber;
an igniter in said combustion chamber for igniting the fuel in the mixture to produce a high temperature high pressure gas;
an output shaft; and
means for converting the pressure of the high pressure gas produced in said combustion chamber into a rotative force applied to said output shaft, said converting means including a dynamic rotor cylinder, a dynamic rotor eccentrically rotatably mounted in said dynamic rotor cylinder, means for directed the high pressure gas produced in said combustion chamber into a high pressure space in said dynamic rotor cylinder so as to press against said dynamic rotor and rotate said dynamic rotor eccentrically in said dynamic rotor cylinder, said dynamic rotor being coupled to said output shaft so as to rotate said output shaft when said dynamic rotor rotates;

said converting means further including a hollow shaft, said dynamic rotor being eccentrically fixed to said hollow shaft, said dynamic rotor cylinder having a cylindrical interior surface and having means for, together with said dynamic rotor, separating the space between said dynamic rotor and said cylinderical interior surface into said high pressure space and a low pressure space sealingly separated from said high pressure space;

said hollow shaft having a long hollow shaft portion having a porcelain heat-insulating layer formed on the inner surface thereof and defining an exhaust passage, on one side of said dynamic rotor, and a short hollow shaft portion defining an intake passage on the other side of said dynamic rotor;

said dynamic rotor having a hollow internal space and an inclined partition in said internal space separating said internal space into a first hollow rotor portion communicating with said high pressure space and the interior of said short hollow shaft portion, and a second hollow rotor portion communicating with said low pressure space and the interior of said long hollow shaft portion, said high pressure gas directing means including said interior of said short hollow shaft portion, said interior of said short hollow shaft portion commuciating with said combustion chamber;

said compressing means comprising a compressor, a compressive rotor cylinder, a compressive rotor having a sleeve sleeved over said long hollow shaft portion so as to eccentrically mount said compressive rotor on said hollow shaft for eccentric rotation in said compressive rotor cylinder, means for drawing fresh air into said compressive rotor cylinder, means for rotatively decouplably coupling said starter motor and coupling said dynamic rotor to said compressive rotor so as to compress the fresh air drawn into said compressive rotor cylinder, and means for directing air compressed in said compressive rotor cylinder into said compressor for further compression;

said rotary engine further comprising a first side cover sealingly covering one side of said compressive rotor cylinder, and a second side cover sealingly covering one side of said dynamic rotor cylinder, said first side cover having a first flange and a first main bearing in said first flange rotatively supporting said sleeve and long hollow shaft portion therein, said second side cover having a second flange and a second main bearing in said second flange rotatively supporting said short hollow shaft portion therein.

* * * * *